United States Patent
Barbieri et al.

(10) Patent No.: US 9,803,988 B2
(45) Date of Patent: Oct. 31, 2017

(54) METHOD AND/OR SYSTEM FOR WALKING ROUTE RECOMMENDATION

(71) Applicant: Excalibur IP, LLC, New York, NY (US)

(72) Inventors: Nicola Barbieri, Barcelona (ES); Daniele Quercia, Barcelona (ES)

(73) Assignee: Excalibur IP, LLC, New York, NY (US)

(*) Notice: Subject to any disclaimer, the term of this patent is extended or adjusted under 35 U.S.C. 154(b) by 249 days.

(21) Appl. No.: 14/586,540

(22) Filed: Dec. 30, 2014

(65) Prior Publication Data
US 2016/0187151 A1    Jun. 30, 2016

(51) Int. Cl.
*G01C 21/20* (2006.01)
*G01C 21/34* (2006.01)
*G01C 21/36* (2006.01)

(52) U.S. Cl.
CPC ......... *G01C 21/3446* (2013.01); *G01C 21/20* (2013.01); *G01C 21/3679* (2013.01)

(58) Field of Classification Search
CPC ............ G01C 21/3446; G01C 21/3453; G01C 21/3697; G06F 17/30958
USPC .......................................................... 701/540
See application file for complete search history.

(56) References Cited

U.S. PATENT DOCUMENTS

| | | | | |
|---|---|---|---|---|
| 8,214,142 B2* | 7/2012 | Cerecke | ............. | G01C 21/3446 340/425.5 |
| 8,886,453 B2* | 11/2014 | Cerecke | ............. | G01C 21/3446 701/422 |
| 2009/0234577 A1* | 9/2009 | Rinscheid | .......... | G01C 21/3415 701/533 |
| 2010/0121566 A1* | 5/2010 | Joshi | .................. | G01C 21/3461 701/533 |
| 2010/0235082 A1* | 9/2010 | Taniyama | .......... | G01C 21/3423 701/533 |
| 2012/0016582 A1* | 1/2012 | Cerecke | ............. | G01C 21/3446 701/410 |
| 2012/0158299 A1* | 6/2012 | Cerecke | ............. | G01C 21/3446 701/533 |
| 2013/0116919 A1* | 5/2013 | Furuhata | ............ | G01C 21/3629 701/408 |
| 2013/0191025 A1* | 7/2013 | Tava | ................... | G01C 21/3453 701/533 |
| 2014/0019041 A1* | 1/2014 | Kluge | ................ | G01C 21/3469 701/430 |
| 2015/0134675 A1* | 5/2015 | Ellis | .................. | G06F 17/30699 707/754 |
| 2015/0323341 A1* | 11/2015 | Farrell | ............... | G01C 21/3644 701/426 |
| 2016/0019496 A1* | 1/2016 | Gorlin | .................... | H01M 4/364 705/333 |
| 2016/0104112 A1* | 4/2016 | Gorlin | .............. | G06Q 10/08355 705/338 |

(Continued)

OTHER PUBLICATIONS

Factorization Machines, Steffen Rendle, May 2012.*

(Continued)

*Primary Examiner* — Harry Oh
(74) *Attorney, Agent, or Firm* — Berkeley Law & Technology Group, LLP

(57) ABSTRACT

Methods and/or systems are provided that may be utilized to recommend a contextual walking route for a number of venues, for example.

20 Claims, 7 Drawing Sheets

Axial Graph

Segment Graph

(56) References Cited

U.S. PATENT DOCUMENTS

2016/0104113 A1* 4/2016 Gorlin ............ G06Q 10/08355 705/338

OTHER PUBLICATIONS

From Axial to Road—Centre Lines, Alisdair Turner, Jun. 2007.*
Salvatore Scellato et al., "Exploiting Place Features in Link Prediction on Location-based Social Networks", KDD'11, Aug. 21-24, 2011, San Diego, California, USA. Copyright 2011 ACM 978-1-4503-0813-7/11/08.
Zhiyuan Cheng et al., "Exploring Millions of Footprints in Location Sharing Services". Proceedings of the Fifth International AAAI Conference on Weblogs and Social Media, 2011.
Steffen Rendle, "Factorization Machines", Department of Reasoning for Intelligence, The Institute of Scientific and Industrial Research, Osaka University, Japan.
Alasdair Turner, "From axial to road—centre lines: a new representation for space syntax and a new model of route choice for transport network analysis", Environment and Planning B:, Planning and Design 34(3) 539{555, 2007, doi:10.1068/b32067.
Hartwig Hochmair et al., "Influence of estimation errors on wayfinding-decisions in unknown street networks—analyzing the least-angle strategy", Spatial Cognition and Computation 2: 283-313, 2000.2 002 Kluwer Academic Publishers. The Netherlands.
B. Hillier et al., "Natural movement: or, configuration and attraction in urban pedestrian movement", Environment and Planning B:, Planning and Design, 1993, vol. 20, pp. 29-66.
Daniel Montello, "Spatial Orientation and the Angularity of Urban Routes: A Field Study", Environment and Behavior, vol. 23, No. 1, Jan. 1991, pp. 47-69.
Bill Hillier et al., "The City as One Thing", Progress in Planning, 67 (3), 2007, pp. 205-230.
Sergio Porta et al., "The Network Analysis of Urban Streets: A Dual Approach", Physica A: Statistical Mechanics and its Applications 369 (2), 2006, pp. 853-866.
Carlo Ratti, "Urban texture and space syntax: some inconsistencies", Environment and Planning B: Planning and Design 2004, vol. 31.
Peter Hart et al., "A Formal Basis for the Heuristic Determination of Minimum Cost Paths", IEEE Transactions of Systems Science and Cybernetics, vol. SSC-4, No. 2, Jul. 1968.
Steffen Rendle et al., "BPR: Bayesian Personalized Ranking from Implicit Feedback", Association for Computing Machinery, 2009.
Christoph Hölscher et al., "Capturing Indoor Wayfinding Strategies and Differences in Spatial Knowledge with Space Syntax", Proceedings, 6$^{th}$ International Space Syntax Symposium, Istanbul, 2007.

* cited by examiner

METHOD AND/OR SYSTEM FOR WALKING ROUTE RECOMMENDATION

BACKGROUND

1. Field

The subject matter disclosed herein relates to a method and/or system for generating a walking route recommendation.

2. Information

More than half of the world's population currently lives in cities and by 2050, more than 70% may well live in cities. As more individuals move to cities, its residents may be encouraged to walk rather than drive or use other means of transportation. Quality navigation tools might help with this. Residents typically utilize mobile mapping services if walking around a city, for example. Typically, mobile mapping services suggest shortest routes, perhaps because it is relatively easy to generate and/or because time is frequently assumed to be a highly valued resource. Alternative approaches may, however, be appealing to users.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system is the Hadoop distributed computing system, which employs a map-reduce type of architecture. In the context, the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and to distribute the one or more pairs to the computing devices of the network. A reduce operation and/or similar terms refer to processing of signals via a summary operation (e.g., such as counting the number of students in a queue, yielding name frequencies). A system may employ such an architecture for processing by marshalling distributed servers, running various tasks in parallel, and managing communications and signal transfers between various parts of the system, in an embodiment. As mentioned, one non-limiting, but well-known example, is the Hadoop distributed computing system. It refers to an open source implementation of a map-reduce type architecture, but may include other aspects, such as the Hadoop distributed file system (HDFS). In general, therefore, Hadoop and/or similar terms refers to an implementation scheduler for executing large processing jobs using a map-reduce architecture.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes so as to be capable to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately compatible and/or compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a URL for accessibility via the Web, in an example embodiment. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content (e.g., digital content) provided to a user in a form so that the user is able to perceive the underlying content itself (e.g., hear audio or see images, as examples) is referred to, with respect to the user, as 'consuming' content, 'consumption' of content, 'consumable' content and/or similar terms. For one or more embodiments, an electronic document may comprise a Web page coded in a markup language, such as, for example, HTML (hypertext markup language). In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to content, such as content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Signal packets and/or frames, also referred to as signal packet transmissions and/or signal frame transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame in accordance with a target and/or destination address and availability of a network path of network nodes to the target and/or destination address. Although the Internet and/or the Web comprises a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer approach and/or description. A network protocol refers to a set of signaling conventions, such as for computing and/or communications transmissions, as may, for example, take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

Typically, a network protocol, such as protocols characterized substantially in accordance with the aforementioned OSI description, has several layers. These layers may be referred to here as a network stack. Various types of transmissions, such as network transmissions, may occur across various layers. A lowest level layer in a network stack, such as the so-called physical layer, may characterize how symbols (e.g., bits and/or bytes) are transmitted as one or more signals (and/or signal samples) over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are compatible and/or compliant with a particular network protocol at these higher-level layers. For example, higher-level layers of a network protocol may, for example, affect device permissions, user permissions, etc.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerated if the remote device is power cycled, for example. Also, a VPN typically may affect a single remote device, for example, in some situations. A network may be very large, such as comprising thousands of nodes, millions of nodes, billions of nodes, or more, as examples.

More than half of the world's population currently lives in cities and by 2050, more than 70% may well live in cities. As more individuals move to cities, its residents may be encouraged to walk rather than drive or use other means of transportation. Quality navigation tools might help with this. Residents typical utilize mobile mapping services if walking around a city, for example. Typically, mobile mapping services suggest shortest routes, perhaps because it is relatively easy to generate and/or because time is frequently assumed to be a highly valued resource. Alternative approaches may, however, be appealing to users.

For example, activities in a city often shift cyclically and/or progressively as contextual factors (e.g., factors such as time of day and/or weather) change. For example, venues that people in a city go to at night may be different than venues that people go to during the day. Accordingly, paths that people in the city take may change depending on the contextual factors because the paths may be more interesting, enjoyable, and/or appealing for a given context. However, current navigation and/or wayfinding tools do not appear to take into account city dynamics and/or other different contextual factors.

In this context, the terms mapping system, navigation system, mobile mapping services, way-finding application, urban mapping system, urban navigation tool, trip recommendation system and/or similar terms are used interchangeably. These and/or similar terms refer a system comprising a computing device having software (which may comprise firmware) installed thereon to create, generate, determine and/or otherwise compute a walking route for a geographic area, typically in response to a user entered request. Thus, a PDA, a smart phone, a cell phone, a lap top computer, a tablet, a desktop computer and/or a wearable computing device may include a mapping system (hereinafter 'system').

As shall be described in greater detail, in an embodiment, a system, for example, may generate a contextual route recommendation. Here, a contextual route recommendation and/or similar terms refer to a path (e.g., route), such as a walking path, selected among various alternatives to be desirable based at least in part on considerations that include spatial cognition and/or contextual factors.

For example, a system may generate a recommended route between two points or locations. As an example, current mapping tools focus on recommending shortest routes between two locations, as previously indicated. Current mapping tools do not appear to address complexities of city environments. Thus, city dynamics are not considered, such as differences between day and night.

Figure 1:
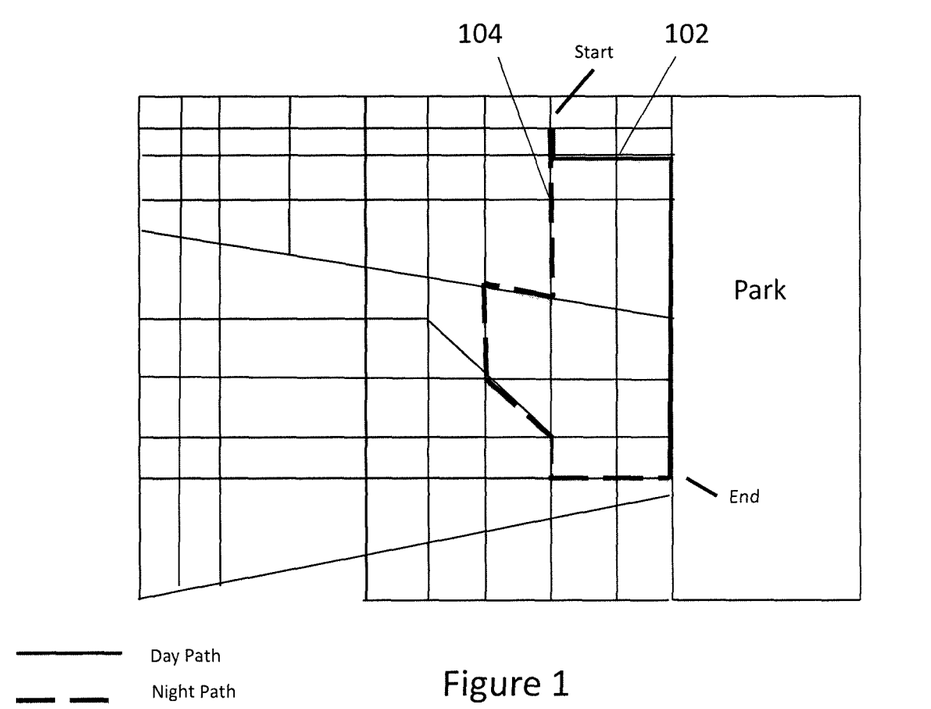
FIG. 1 is a map illustrating different routes.

In Barcelona, as an illustration, differences exist in popularity and/or usage of paths between two points, here, as an example, 'Arc de Triomf' and 'Estacio de Franca', during the day versus at night. FIG. 1, for example, is a map to illustrate different routes taken between a source location and a destination location in different contexts. Different paths are shown for day (day path 102) and night (night path 104). During daylight, Foursquare users may go through the park, while at night, Foursquare users may go through little streets full of cocktail bars. Foursquare comprises a wireless communication device application software program (or app) that uses a device's built-in global positioning system's functionality to display restaurants, bars, parks, and/or other venues in an area. If an individual visits any of those locations, the individual "checks in" on the Foursquare app, which broadcasts, such as your location, to friends. Thus, a number of user check-ins at a venue may provide an indication of appeal.

Continuing with one or more illustrative embodiments, a system may have starting and ending locations (designated, s and t, respectively) for a path (e.g., route), designated $P_{s,t}$. Here, starting and ending locations may also be referred to as source and destination locations.

A city map includes a variety of venues. Venues refer to physical locations (e.g., a business, residence, restaurant, etc.), which may be categorized into a type, T (e.g., venue types may include food, entertainment, retail shop, etc.). A set of venues (V) here are denoted as $\{v_1, v_2 \ldots v_N\}$ and here $t(v_i)$ denotes a venue's category.

Venue usage may change and/or vary, such according to contextual factors, for example. In an embodiment, an m-dimensional binary array of signal samples, for example, may provide contextually related and/or descriptive parameters. For example, an array may comprise signal samples $\{c_1, c_2 \ldots, c_M\}$. As an example, assuming contextually related-dimensions of (day, night, weekday, weekend, rainy, sunny), a contextually descriptor (e.g., descriptive vector of signal samples) may comprise c={1, 0, 0, 1, 0, 1} for "day, weekend, and sunny."

A venue's desirability (e.g., appeal) may affect its popularity and/or usage. Likewise, these may be measured by a host of different methods. Furthermore, as suggested, contextual factors that may be subject to change may affect popularity and/or usage. Thus, an ability of a system, for example, in an embodiment to comprehend and/or capture factors, such as these, may be of value.

In one embodiment, for example, a path may be characterized in a spatial relationship. One example approach is known as space syntax, although others exist as well. See Hillier, B. and Hanson J., (1984), *The social logic of space*, Cambridge University Press. Space syntax has been utilized in architecture previously. Claimed subject matter is, of course, intended to not be limited in scope to illustrative examples, such as this one.

Continuing with this illustration, in an embodiment, a system may recommend a path, for example, by consideration of contextual dynamics along with spatial features with respect to path selection. Here, as previously mentioned, the term contextual route recommendation and/or similar terms refers to path selection and/or recommendation made via consideration of contextual dynamics along with spatial features. Of course, where two paths appear equivalent in these latter respects, of the two, the shorter route would typically be recommended.

In an example embodiment, a count of Foursquare check-ins may be employed as a measurement of a venue's usage. Foursquare check-ins comprise venue visits by individuals which may provide a measurement of a venue's appeal/usage. Here, a measurement may be referred to as $y(v_i;c)$, where y comprises a count of check ins for venue i in context c. Of course, venue usage may not necessarily be observed or measured for all venues under all contexts. In other words, venue usage measurements may often or at least at times not be complete; however, usage may be predicted and/or estimated. In an example embodiment, estimated usage of venue $v_i$ under context c is $\hat{y}(v_i;c)$.

In an example embodiment, a system may also conveniently utilize Factorization Machine framework-type techniques to estimate venue usage with respect to $(v_i, c)$, for example. Estimation of parameters for factorization machine framework may be accomplished in several ways including stochastic gradient descent, alternating least-squares, and/or Markov Chain Monte Carlo inference. For an embodiment, a benefit of the foregoing technique, although claimed subject matter is not limited in scope to these techniques, may be that predicted venue usage $\hat{y}(v_i;c)$ may comprise a linear combination, such as of interactions between available input parameters and K latent factors, as an example, making it potentially computationally appealing for signal processing. Approaches like this have been used elsewhere with reasonable results. Thus, in an example embodiment, a system may generate an estimated venue usage substantially in accordance with the following:

$$\hat{y}(v_i; c) = w_v^0 + w_{t(v_i)}^T + \sum_{j=1}^{M} c_j \cdot \sum_{k=1}^{K} (U_{v_i,k}^V + U_{t(v_i),k}^T) \cdot U_{j,k}^C,$$

In this example embodiment, parameters of the relationship shown above comprise:

$w^0 \in \mathbb{R}^{1 \times N}$ is the estimated number of check-ins for each venue without considering context and venue type;

$w^T \in \mathbb{R}^{1 \times T}$ is the estimated number of check-ins for each venue type without considering context;

$U^V \in \mathbb{R}^{N \times K}$ reflects all venues' positions in the latent space;

$U^T \in \mathbb{R}^{T \times K}$ reflects all venue types' positions in the latent space;

$U^C \in \mathbb{R}^{M \times K}$ reflects all contexts' positions in the latent space.

As mentioned, it is expected that usage measurements collected may not be complete. Therefore, to obtain more accurate estimates from available measurements, an approach substantially in accordance with the following is employed, which includes a logistic link operation. A logistic link function maps real numbers to an interval [0,1] and is widely used in statistics and machine learning with good results.

$$\Theta^* = \underset{\Theta}{\mathrm{argmax}} \sum_{\substack{(v_i,c),(v_h,c) \in Y \\ y(v_i;c) > y(v_h;c)}} \ln \sigma(x_{i,h,c}) - \lambda \|\Theta\|^2,$$

In an example embodiment, a logistic link operation $x_{i,h,c}$ may be generated substantially in accordance with the following $$x_{i,h,c} = \hat{y}(v_i; c) - \hat{y}(v_h; c), \sigma(x) = \frac{1}{1 + e^{-x}} |$$

in which $\|\Theta\|$ comprises a normalization of factorization parameters. A prior distribution that comprises a Gaussian of zero mean and $\lambda I$ variance may be denoted as $\Theta \sim N(0,\lambda I)$. Sample values of $\lambda$ may, for example, comprise 0.1, 0.01, or 0.0025.

Thus, for at least one embodiment, a venue usage estimation process may not necessarily focus on error loss to score individual venues. Instead, for at least one embodiment, a system may include an estimation process to rank source and destination venue pairs reasonably accurately. To do so, a logistic loss function is employed and handled as convex if one parameter is free and other parameters are fixed. Thus, an estimation process may employ a stochastic gradient ascent procedure with multiple iterations.

For an iteration, a stochastic gradient procedure may select a venue $v_i$ and a corresponding training sample $(v_i, c)$ and sample another venue $v_h$ at random. The training sample may be selected so that $y(v_i; c) > y(v_h, c)$ (e.g., usage of the training sample is greater). A stochastic gradient procedure may, thus, be determined substantially in accordance with the following.

$$\Theta_p \leftarrow \Theta_p + \alpha \left( \frac{e^{-x_{i,h,c}}}{1+e^{-x_{i,h,c}}} \cdot \frac{\partial}{\partial \Theta_p} x_{i,h,c} - \lambda_p \cdot \Theta_p \right).$$

For example, a stochastic gradient process may, in an embodiment, set a partial derivative $$\frac{\partial}{\partial \Theta_p} x_i, h, c$$

to 1 to determine a parameter $w_{v_i}^0$. Likewise, a partial derivative may, in an embodiment, be set to values as is illustrated below to determine other parameters.

$$\begin{cases} 1 & \text{if } \Theta_p = w_{v_i}^0, w_{t(v_i)}^T \\ -1 & \text{if } \Theta_p = w_{v_h}^0, w_{t(v_j)}^T \\ \sum_{j=1}^{M} c_j \cdot U_{j,k}^C & \text{if } \Theta_p = U_{v_i,k}^V, U_{t(v_i),k}^T \\ -\sum_{j=1}^{M} c_j \cdot U_{j,k}^C & \text{if } \Theta_p = U_{v_h,k}^V, U_{t(v_h),k}^T \\ U_{v_i,k}^V - U_{v_h,k}^V + U_{t(v_i),k}^T - U_{t(v_h),k}^T & \text{if } \Theta_p = U_{j,k}^C, \text{ where } c_j = 1 \\ 0 & \text{otherwise.} \end{cases}$$

In an embodiment, for example, after a venues' usage has been measured and prediction generated, a system embodiment may generate a graph for venue placement (although a different order with respect to processing tasks may be employed in other embodiments, of course). Primal graphs, as inspired by Euler's seven bridges of Konigsberg, characterize an urban layout as a network where nodes are intersections, edges are roads, and edge weights reflect cost. However, it may be that a primal graph does not capture how individuals navigate an area, such as a city.

Thus, in an embodiment, a space syntax framework may alternately be employed to generate a graph of an urban layout, for example. Space syntax potentially may more accurately account for ways people interact and/or perceive an area, such as to be navigated, for example. A space syntax type approach, in general, may reduce an urban layout, as an example, to sets of points and lines to form an axial map. For an axial map, for example, an open space may be approximated by a series of straight lines (e.g., street segments or axial lines) and connections of axial lines may comprise features visible to an individual walking along a path. Likewise, a dual graph (e.g., map) may be generated from an axial map. In a dual, an axial line becomes a node and an intersection between axial lines becomes an edge.

Potential benefits may include, for example, that pedestrian movement may correlate better with a centralized approach, that a more linear, more compact approximation of an urban layout may result, and/or number of overall features may be reduced potentially meaning real-time processing may be possible potentially, which may be desirable, particularly for mobile mapping and/or navigation applications. Third, it may be that a dual of an axial map may be more akin to how individual's view and/or process an area, such as for navigation. For example, it may be that individuals tend to remove irregularities in a map to strengthen and/or simplify a map into horizontals and verticals, rather than remembering diagonals, for example.

Thus, a system embodiment may utilize a dual of an axial map. In an example embodiment, a system may further process a map, such as by utilizing angular segment processing techniques, including but not limited to, Angular Segment Analysis (ASA). See Turner, A. (2007), From axial to road-centre lines: a new representation for space syntax and a new model of route choice for transport network analysis, *Environment and Planning B: Planning and Design*, 34(3)539-555. In an example embodiment, axial lines may be divided into segments and angles between segments may be determined. For example, an axial segment sg=(s,t) comprises a straight line connecting source location s and destination location t. S and t are on the same street so that for this example the destination is reachable without a turn.

Figure 2:
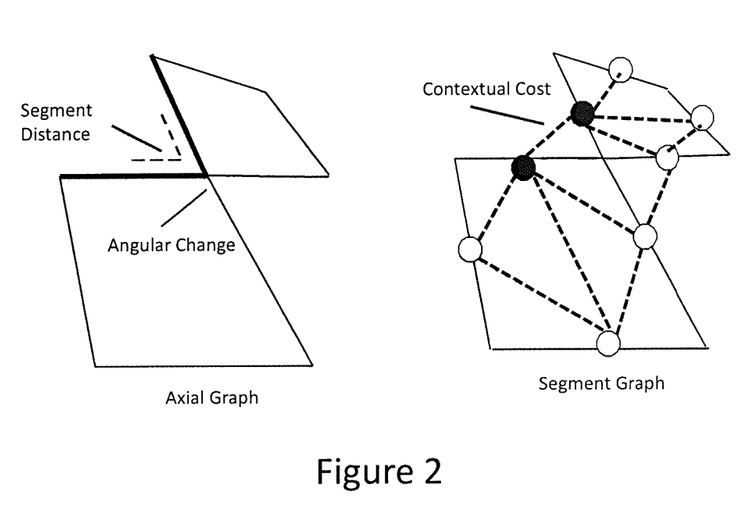
FIG. 2 is a map illustrating a segment graph.

Thus, in an embodiment, a graph of an urban layout, for example, may comprise a segment graph. FIG. 2 illustrates an embodiment of a graph having axial segments and a corresponding segment graph. In FIG. 2, the left side shows distance and angular change for axial segments; the right side shows contextual cost in a segment graph. In FIG. 2, a segment graph G=(S, E) is shown that has been generated for an urban layout example. S comprises set of axial segments and E⊆S×S specifies an adjacency relationship between segments. In an embodiment, a system may then estimate costs for edges of a generated graph.

In an embodiment, a system may estimate a cost substantially in accordance with two parameters in this example. Of course, claimed subject matter is not limited in scope to illustrative examples. However, here, for example, distance (e.g., $d_{f,g}$) and angular change (e.g., $\Theta_{f,g}$) may be employed, although, again, other approaches may also be employed.

In an example embodiment, a system may calculate distance between adjacent segments as half the sum of their lengths, as indicated below. Of course, equivalent other approaches to calculate distance alternately may be employed in an embodiment. Nonetheless, here, for example, distance may be calculated substantially in accordance with the following:

$$d_{f,g} = \frac{len(sg_f) + len(sg_g)}{2},$$

A system embodiment may also generate angular change between two segments, for example. Angular change (θ), for example, may be determined to be proportional to an angle of incidence of two segments at the intersection and, in an embodiment, may be normalized in an interval (0,1). For example, in this example illustration, θ is 0 if there is no turn; Θ is 0.5 if there is a 90 degree turn; Θ is 1.0 if there is a 180 degree turn. Of course, again, a variety of other approaches may be used with satisfactory results in other embodiments.

Typically, a route with a variety of changes in direction may be perceived to be longer. For example, a turn may bring into view an additional set of physical aspects to be handled, which may add complexity. An embodiment may take a factor such as this into account to generate a recommendation, for example, as described in more detail below.

On a segment graph G, for example, a path $P_{s,t}$ (between points s and t) may comprise a sequence of adjacent segments. As an example, in an embodiment, a path $P_{s,t}$ from s to t may be generated, such as substantially in accordance with Dijsktra's process, or by using another computational approach. In a process of path generation, weights of edges on a segment graph (e.g., edge costs) may affect path selection. Thus, in an embodiment, it may be desirable for weights, for example, in an embodiment, to be contextually determined at least partially. Accordingly, edges may have a contextual cost, in one embodiment, in the form of a weight, for example. Of course, a negative cost may comprise a benefit in this example embodiment.

In an example embodiment, a system may generate a contextual cost of walking from $sg_f$ to segment $sg_g$ substantially in accordance with the following considerations, for example:

distance $d_{f,g}$ to walk;
angular change $\theta_{f,g}$ experienced; and/or
appeal and/or popularity of the particular segments, such as $sg_f$ and $sg_g$, in the particular context, c, which may be based at least partially on usage and/or predicted usage of relevant venues for an embodiment.

Thus, for an embodiment, a weight may quantify a contextual cost for a segment, such as walking from a segment $sg_f$ to a segment $sg_g$, for example, substantially in accordance with the following:

$$w_{f,g}(c) = f(d_{f,g}, \theta_{f,g}, b(sg_f; c), b(sg_g; c)),$$

Quantifying or measuring segment distance and/or angular change for an embodiment, for example, was discussed above. However, a variety of approaches may be employed to estimate appeal. For example, usage and/or predicted usage, discussed previously, may indicate popularity, a potential measure of appeal at least partially.

In an example embodiment, for example, a system may calculate a measurement of appeal and/or popularity. As an illustration, an embodiment may perform processing to take at least the following into account: venues on the particular segment/edge; segments (e.g., their venues) on that axial line (e.g., visible from the particular segment/edge); and/or other segments (e.g., their venues) crossing and/or adjacent to the particular segment/edge.

Figure 3:
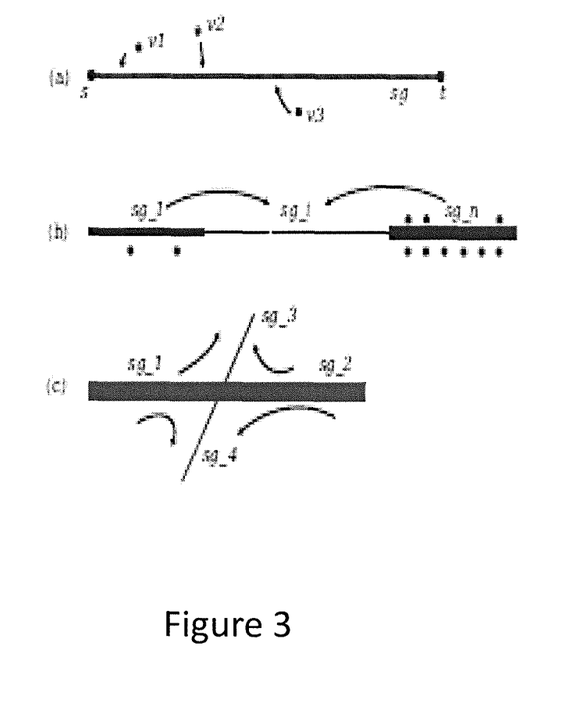
FIG. 3 is a schematic diagram showing various segment relationships.

FIG. 3(a) illustrates venues on a segment/edge; FIG. 3(b) illustrates segments that include venues visible from a segment/edge. FIG. 3(c) illustrates other segments/edges that cross and/or may be adjacent to a segment/edge.

Thus, in an example embodiment, in one iteration, for example, a segment may have appeal if venues on it have appeal. Thus, an iteration may be performed substantially in accordance with the following:

$$b^0(sg_f; c) = \sum_{v_i \in V(f)} \hat{y}(v_i; c),$$

where $V(f) \subseteq v$ is the set of venues on segment $sg_f$.

Likewise, in another iteration, a segment may have appeal if 'co-linear' segments have appeal. Thus, an iteration may be performed substantially in accordance with the following:

$$b^1(sg_f; c) = b^0(sg_f) + \sum_{\substack{sg_g \neq sg_f \\ Ax(sg_f) = Ax(sg_g)}} b^0(sg_g; c) \cdot \exp\left(-\frac{d_{f,g}^2}{2\sigma^2}\right),$$

where $Ax(sg_f)$ is segment $sg_f$'s axial line.
Conceptually, a segment propagates its influence to nearby segments. Co-linear refers to the same axial line in this context. Variance is employed here in an exponential to discount for distance.

Likewise, in yet another iteration, a segment may have appeal if adjacent and/or crossing segments have appeal. Thus, an iteration may be performed substantially in accordance with the following:

$$b(sg_f; c) = b^1(sg_f; c) + \lambda \left( \sum_{\substack{sg_g \text{ is adj to } sg_f \\ Ax(sg_g) \neq Ax(sg_f)}} b^1(sg_g; c) \right)$$

In an embodiment, for example, $\lambda \in \{0,1\}$ may at least partially affect influence of adjacent segments, for example. As an illustration, $\lambda$ may be set to 0.25, which might suggest, for example, that a person may walk on the street to see something interesting around the corner. Thus, in a system may utilize these aspects to formulate contextual cost for edges of a graph.

A further consideration for an embodiment may relate to tolerance and/or comfort with more complex paths. For example, residents of a neighborhood may be more comfortable with paths including turns whereas visitors, for example, may prefer not to turn, if possible.

For example, in an embodiment, a system may generate contextual cost for an edge substantially in accordance with the following:

$$w_{f,g}(c) = \underbrace{d_{f,g}(\theta_{f,g}(1-\alpha_u)+1)}_{part\ I} \cdot \underbrace{\exp\left(-\frac{(b(sg_f; c) + b(sg_g \mid c))^2}{2\gamma^2}\right)}_{part\ II}. \quad (1)$$

Part I involves generating angularity. In an embodiment, segment distance may be multiplied by angular change. Likewise, in an embodiment, to balance distance and angular change, $\alpha_u \in \{0,1\}$ captures an individual's familiarity with a neighborhood or city. For first timers, e.g., tourists or visitors to the area, for example, au may comprise near 0 and angular change may have a greater impact. For long-time residents, $\alpha_u$ may comprise near 1 and angular change may have little effect.

Figure 4:
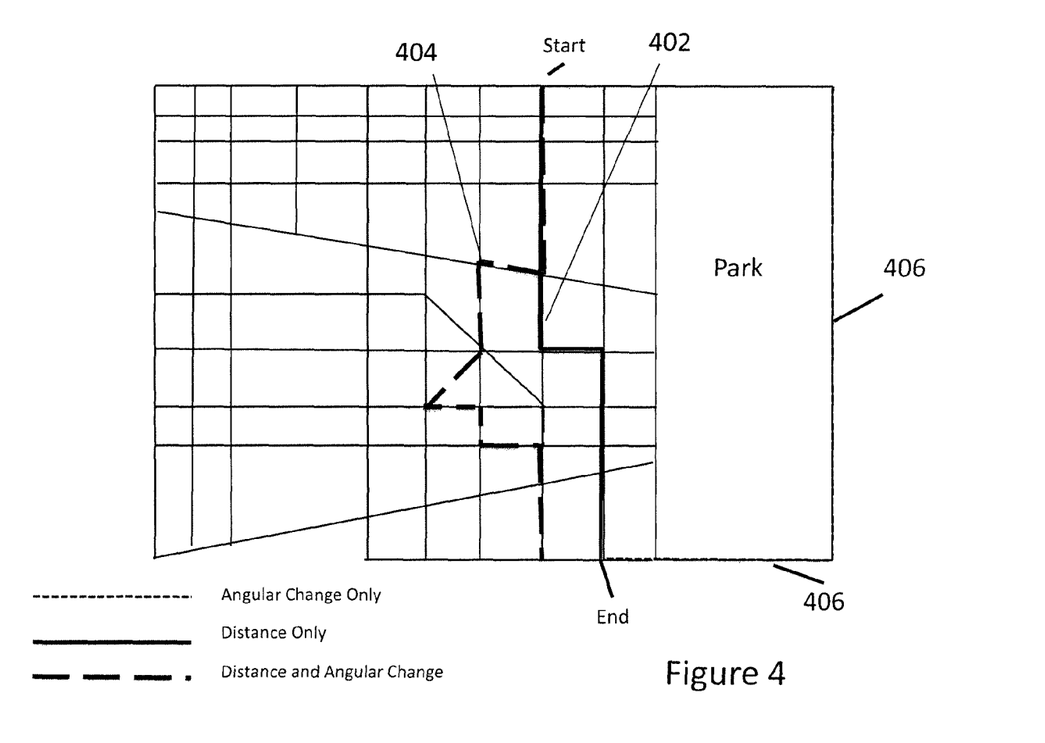
FIG. 4 is a map showing different paths.

FIG. 4 illustrates impact of familiarity on route recommendation according to an embodiment. Path 404 takes into consideration distance and angular change (e.g., tourists with a near zero parameter); path 402 considers distance (e.g., a near unity parameter for a long-time residents); and path 406 takes into consideration angular change with distance having less or no impact.

In part II of above, appeal for two edges operate as multiplier factors for distance with a Gaussian kernel. Illustratively, the more interesting the segments, the closer the kernel function is to 0, and the smaller the perceived distance relative to actual distance. If two segments are not appealing, a kernel may be closer to 1 with distance having a more discouraging influence as being greater.

Figure 5:
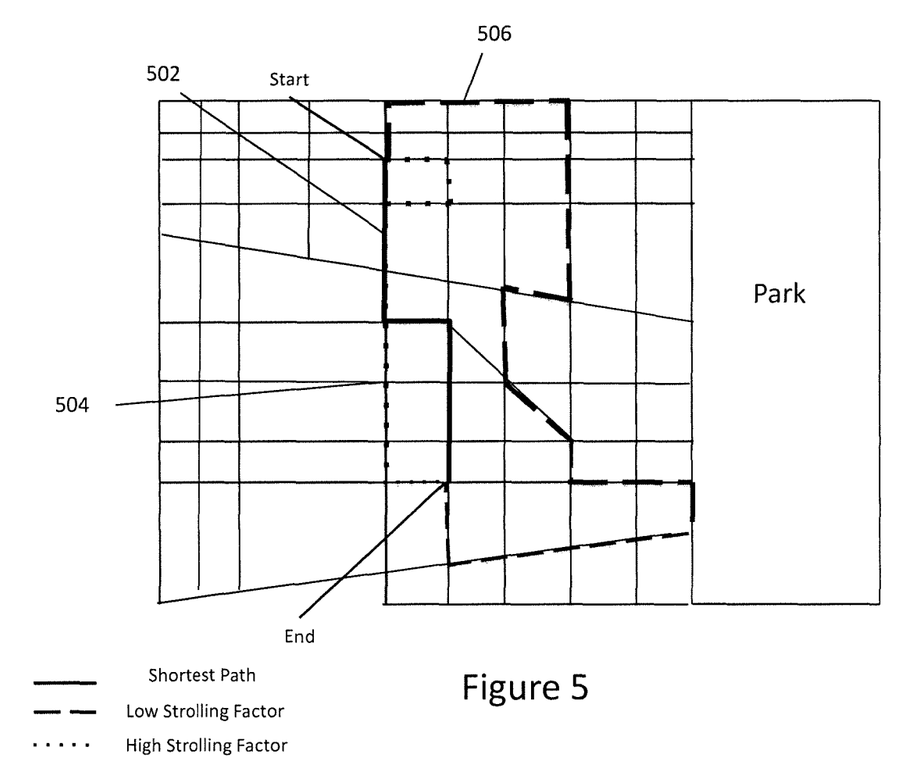
FIG. 5 is a map showing different paths.

Furthermore, an embodiment may also include a strolling factor γ, e.g., a weighting factor to affect contextual cost. Illustratively, a low strolling factor on a relative basis allows for recommending paths that are long while a high strolling factor on a relation basis allows for recommending paths that are short. As illustrated in FIG. 5, as a strolling factor increases, and a recommended path decreases in length. Path 504 includes a high strolling factor and its length is similar to the shortest path's length. Path 506 includes a lower strolling factor and its length is longer as compared to the shortest path's length. Illustratively, in an embodiment, if there is a lower strolling factor, a recommended route may be longer suggesting those individuals may not mind a longer walk if a venue is appealing.

Figure 6:
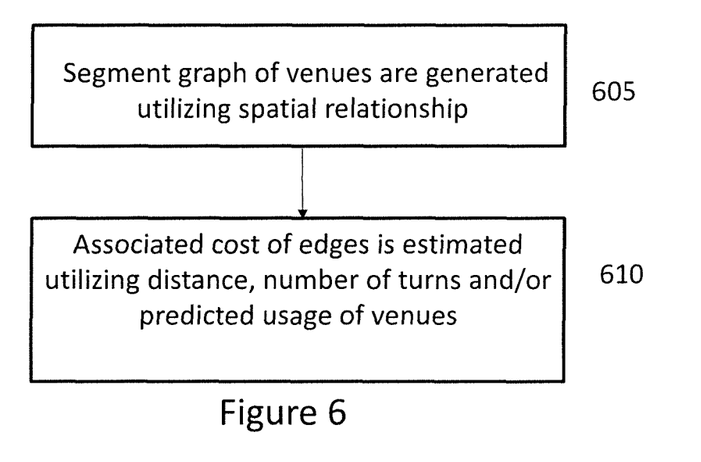
FIG. 6 is a flow chart of an embodiment.

Thus, in an embodiment, a contextual route recommendation may be generated that may account for individual perceptions and/or changes in context. FIG. 6 is a flow diagram of an embodiment of a process to generate a contextual route recommendation. Of course, embodiments are intended to be illustrative examples rather than be limiting with respect to claimed subject matter. Likewise, for ease of explanation, an embodiment may be simplified to illustrate aspects and/or features in a manner that is intended to not obscure claimed subject matter through excessive specificity and/or unnecessary details. Embodiments in accordance with claimed subject matter may include all of, less than, or more than blocks 605-610. Also, the order of blocks 605-610 is merely as an example order.

Referring to FIG. 6, at block 605, a segment graph of venues is generated. In a segment graph, as previously discussed, edges include an associated cost. At block 610, associated cost is estimated utilizing at least distance between a source and destination, number of turns and/or predicted usage of venues. In an embodiment, as discussed previously, a predicted usage of venues may employ factorization machine techniques, such as for more tractable signal processing, for example.

For an embodiment, such as those described above, for example, users may obtain a contextual route recommendation that may be pleasant and/or interesting for a time of the day at which they are walking. A user may also obtain a contextual walking route recommendation that takes other aspects into consideration such as weather, rather than merely generate the shortest path, which in many cases may be full of turns and uninteresting venues. For example, if it is raining, a system embodiment may take into consideration venues that have more usage because they are large and have awnings. As another example, if it sunny, a system embodiment may take into consideration venues that are on the side of street that has shade.

Figure 7:
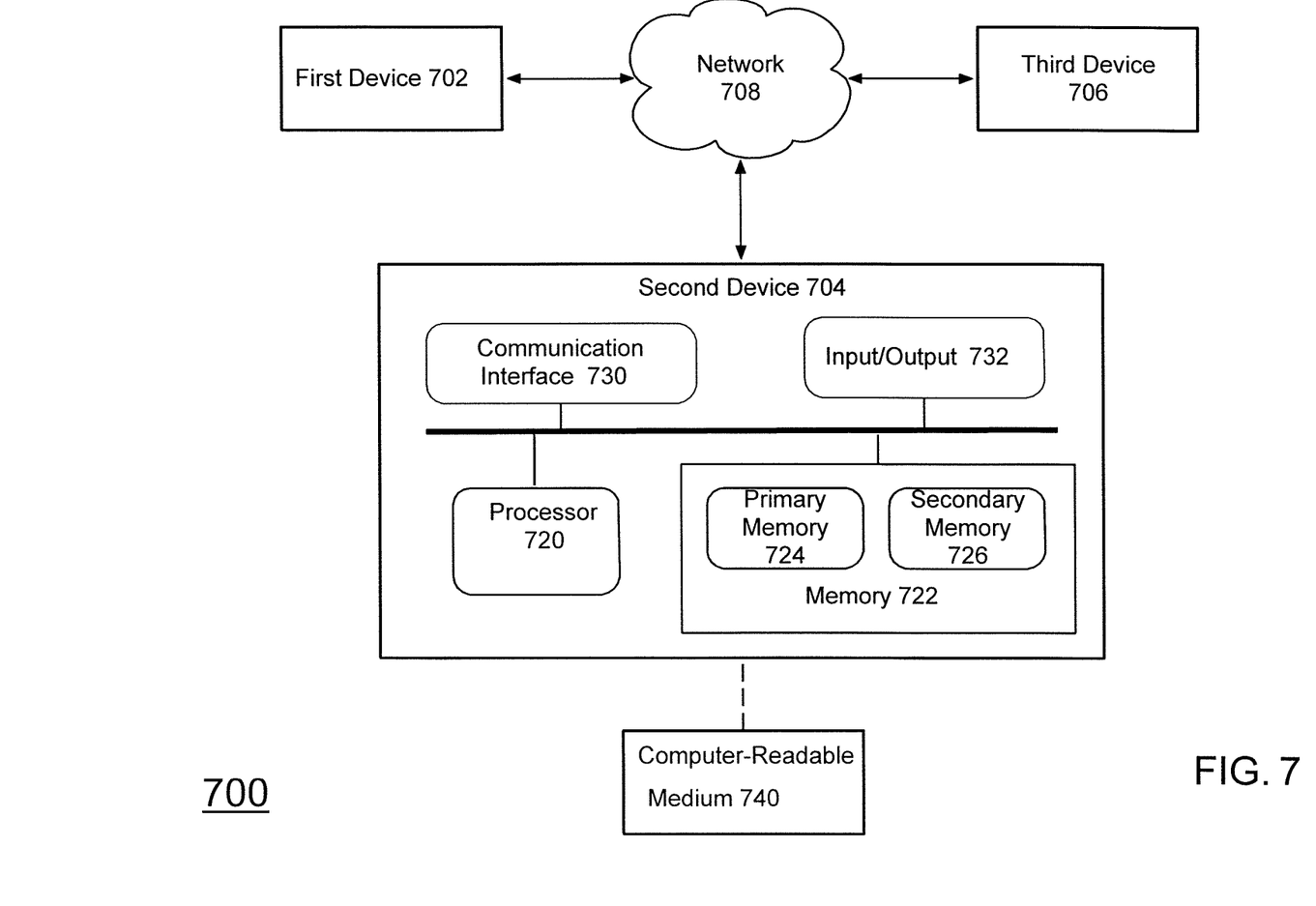
FIG. 7 is a schematic diagram illustrating a computing environment according to an embodiment.

For purposes of illustration, FIG. 7 is an illustration of an embodiment 700 of a system that may be employed in a client-server type interaction, such as described infra, in connection with rendering a GUI via a device, such as a network device and/or a computing device, for example, a client computing device, such as 702, may comprise a mobile computing device with a processor. A mobile computing device may include executable instructions stored in a memory. Stored instructions may be executable, such as by a computing device, as previously suggested. For example, a device, such as 702, may request a source location and a destination location from a user. Instructions may be stored locally and executable to generate a route recommendation from a source and destination location. Alternately, electronic signal transmissions may be initiated across a network, such as 708, to a second device, such as 704, which may comprise a server. Thus, server 704, for example, may include stored executable instructions to generate a route recommendation that may be communicated back to device 702, for example. It is, of course, noted that device 704 may comprise more than one server as well.

In an illustrative example, In FIG. 7, computing device 702 ('first device' in figure) may interface with client 704 ('second device' in figure), which may comprise features of a client computing device, for example. Communications interface 730, processor (e.g., processing unit) 720, and memory 722, which may comprise primary memory 724 and secondary memory 726, may communicate by way of a communication bus, for example. In FIG. 7, client computing device 702 may represent one or more sources of analog, uncompressed digital, lossless compressed digital, and/or lossy compressed digital formats for content of various types, such as video, imaging, text, audio, etc. in the form physical states and/or signals, for example. Client computing device 702 may communicate with computing device 704 by way of a connection, such as an internet connection, via network 708, for example. Although computing device 704 of FIG. 7 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter be limited in scope to illustrative examples.

Memory 722 may be representative of any storage mechanism. Memory 720 may comprise, for example, primary memory 722 and secondary memory 726, additional memory circuits, mechanisms, or combinations thereof may be used. Memory 720 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 720 may be utilized to store a program. Memory 720 may also comprise a memory controller for accessing computer readable-medium 740 that may carry and/or make accessible content, which may include code, and/or instructions, for example, executable by processor 720 and/or some other unit, such as a controller and/or processor, capable of executing instructions, for example.

Under direction of processor 720, memory, such as memory cells storing physical states, representing, for example, a program, may be executed by processor 720 and generated signals may be transmitted via the Internet, for example. Processor 720 may also receive digitally-encoded signals from client computing device 702.

Network 708 may comprise one or more network communication links, processes, services, applications and/or resources to support exchanging communication signals between a client computing device, such as 702, and computing device 706 ('third device' in figure), which may, for example, comprise one or more servers (not shown). By way of example, but not limitation, network 708 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 704, as depicted in FIG. 1, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD)

players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 722 may store cookies relating to one or more users and may also comprise a computer-readable medium that may carry and/or make accessible content, including code and/or instructions, for example, executable by processor 720 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of executing computer instructions on at least one computing device in which the at least one computing device includes at least one processor and at least one memory, the method for determining a walking route for a selection of venues in a navigation system comprising:
    fetching the computer instructions from the at least one memory for execution on the at least one processor;
    executing the computer instructions on the at least one processor of the last one computing device without human intervention;
    storing in the at least one memory of the at least one computing device any results to be generated from the execution on the at least one processor of the to be executed computer instructions;
    wherein the computer instructions to be executed comprises instructions for determining the walking route for the selection of venues;
    wherein the executing the walking route determination instructions comprise:
    generating a segment graph of the venues, the segment graph comprising a plurality of segments, wherein the plurality of segments of the segment graph have an associated weight; and
    estimating the associated weight of the plurality of segments of the segment graph based at least in part on distance of the plurality of segments, number of turns between the plurality of segments and predicted usage of venues on the plurality of segments, the predicted usage being based at least in part on visits by individuals.

2. The method of claim 1, wherein estimating the predicted usage of venues on the plurality of segments is based at least in part on given contextual factors comprising time of day, whether a day is a weekday or weekend, or weather conditions.

3. The method of claim 2, wherein the contextual factors are determined by one or more factorization machine techniques, and the one or more factorization machine techniques include at least one of stochastic gradient descent, alternating least-squares, and/or Markov Chain Monte Carlo inference.

4. The method of claim 1, wherein generating the segment graph is based at least in part on angular segment processing techniques.

5. The method of claim 1, wherein estimating the predicted usage of venues is based at least in part on; usage of venues on other segments adjacent to the plurality of segments with the venues; and/or usage of venues on other segments crossing the plurality of segments with the venues.

6. The method of claim 1, further comprising estimating an associated weight of the plurality of segments of the segment graph based at least in part on angular change between the plurality of segments of the segment graph.

7. The method of claim 1, wherein estimating the distance of the plurality of segments on the walking route further comprises weighting the distance of the plurality of segments based at least in part on a popularity of venues located on the plurality of segments.

8. The method of claim 1, further comprising generating a contextual route recommendation based at least in part on values of the associated weight of the plurality of segments of the segment graph.

9. A system comprising: at least one computing device;
the at least one computing device including at least one processor and at least one memory;
the at least one computing device to execute computer instructions without further human intervention;
the computer instructions to be executed having been fetched from the at least one memory for execution on the at least one processor; and
the at least one computing device to store in the at least one memory of the at least one computing device any results to be generated from the execution on the least one processor of the to be executed computer instructions;
wherein the computer instructions to be executed comprise instructions for execution of determination of a walking route for selected venues in a navigation system;
wherein walking route determination instructions to:
generate a segment graph of venues, the segment graph to comprise a plurality of segments, wherein segments of the segment graph to have an associated weight; and
estimate the associated weight of the plurality of segments of the segment graph, wherein the associated weight of the the plurality of segments to be based at least in part on distance of the plurality of segments, number of turns between the plurality of segments and predicted usage of venues on the plurality of segments, the predicted usage to be based at least in part on visits by individuals.

10. The system of claim 9, wherein the predicted usage of venues on the plurality of segments is to be based at least in part on given contextual factors, the contextual factors to comprise time of day, whether a day is a weekday or weekend, or weather conditions.

11. The system of claim 10, wherein the contextual factors are to be determined by one or more factorization machine techniques, and the one or more factorization machine techniques to include at least one of stochastic gradient descent, alternating least-squares, and/or Markov Chain Monte Carlo inference.

12. The system of claim 9, wherein the segment graph is to be based at least in part on angular processing techniques.

13. The system of claim 9, wherein the predicted usage of venues is to be based at least in part on usage of venues on other segments adjacent to the plurality of segments with the venues; and/or usage of venues on other segments crossing the plurality of segments with the venues.

14. The system of claim 9, wherein the walking route determination instructions to:
estimate an associated weight of the plurality of segments of the segment graph to be based at least in part on angular change between the plurality of segments on the segment graph.

15. The system of claim 9, wherein the walking route determination instructions to:
weigh distance of the plurality of segments, based at least in part on, popularity of venues located on the plurality of segments.

16. An apparatus comprising:
means for fetching from at least one memory means computer instructions;
means for executing fetched computer instructions without further intervention;
means for storing in the at least one memory any results generated from the execution of computer instructions;
wherein the computer instructions comprise instructions for execution of determination of a walking route for selected venues in a navigation system; further comprising:
means for generating a segment graph of the venues, the segment graph comprising a plurality of segments, wherein the plurality of segments of the segment graph have an associated weight; and
means for estimating the associated weight of the plurality of segments of the segment graph based at least in part on distance of the plurality of segments, number of turns between the plurality of segments and predicted usage of venues on the plurality of segments, the predicted usage being based at least in part on visits by individuals.

17. The apparatus of claim 16, wherein the means for estimating the predicted usage of venues on the plurality of segments comprises: means for estimating usage of the venues on other segments adjacent to the plurality of segments with the venues; and/or means for estimating usage of the venues on other segments crossing the plurality of segments with the venues.

18. The apparatus of claim 16, further comprising means for estimating an associated weight of the plurality of segments of the segment graph based at least in part on angular change between the plurality of segments of the segment graph.

19. The apparatus of claim 16, wherein the means for generating a segment graph comprises means for angular segment processing.

20. The apparatus of claim 16, wherein the means for estimating the associated weight of the plurality of segments being based at least in part on popularity of venues located on the plurality of segments.

* * * * *